United States Patent [19]
Fowler

[11] Patent Number: 5,172,531
[45] Date of Patent: Dec. 22, 1992

[54] CONDUIT SUPPORT APPARATUS FOR CONCRETE INSTALLATION

[75] Inventor: Steven L. Fowler, Paulding County, Ga.

[73] Assignee: PK Products, Inc., Conyers, Ga.

[21] Appl. No.: 600,193

[22] Filed: Oct. 18, 1990

Related U.S. Application Data

[63] Continuation-in-part of Ser. No. 518,649, May 3, 1990.

[51] Int. Cl.$^5$ .............................................. E04B 5/00
[52] U.S. Cl. ...................................... 52/221; 52/576; 52/503
[58] Field of Search ..................... 52/221, 576, 503

[56] References Cited

U.S. PATENT DOCUMENTS

| | | | |
|---|---|---|---|
| 1,025,068 | 4/1912 | Knight | 52/221 |
| 2,081,197 | 5/1937 | Goeller | 52/221 |
| 2,775,017 | 12/1956 | McDonough | |
| 3,160,175 | 12/1964 | Laemmle | |
| 3,974,603 | 8/1976 | Vandegriff | |
| 4,061,322 | 12/1977 | LeBlanc | |
| 4,619,087 | 10/1986 | Harbeke | |
| 4,619,471 | 10/1986 | Harbeke | |
| 4,629,155 | 12/1986 | Dula | |
| 4,642,956 | 2/1987 | Harbeke | |
| 4,748,787 | 6/1988 | Harbeke | |
| 4,842,240 | 6/1989 | Pickett | |

OTHER PUBLICATIONS

Carbon Electrical Sciences, Inc.–Product Information Bulletin–Holform Concrete Sleeves.

Primary Examiner—Richard E. Chilcot, Jr.
Assistant Examiner—Wynn Wood
Attorney, Agent, or Firm—Louis T. Isaf

[57] ABSTRACT

A conduit support apparatus for concrete installation which, in the preferred embodiment, includes a collar portion supported above a concrete form by at least one support member, the concrete support apparatus fastened to the concrete form with fasteners which pass through holes in horizontal bottom sections of the support member and into the concrete form, the dimensions of a preferred embodiment of the conduit support apparatus being uniquely balanced to impose a bend on a supported flexible conduit with a curvature within an optimum range of curvatures which is defined between two undesirable limits described by a first small curvature which results in the upper section of the conduit bending back into the form space and a second large curvature which results in the flexible conduit collapsing into itself to reduce the amount of work space within the flexible conduit below an acceptable level.

25 Claims, 3 Drawing Sheets

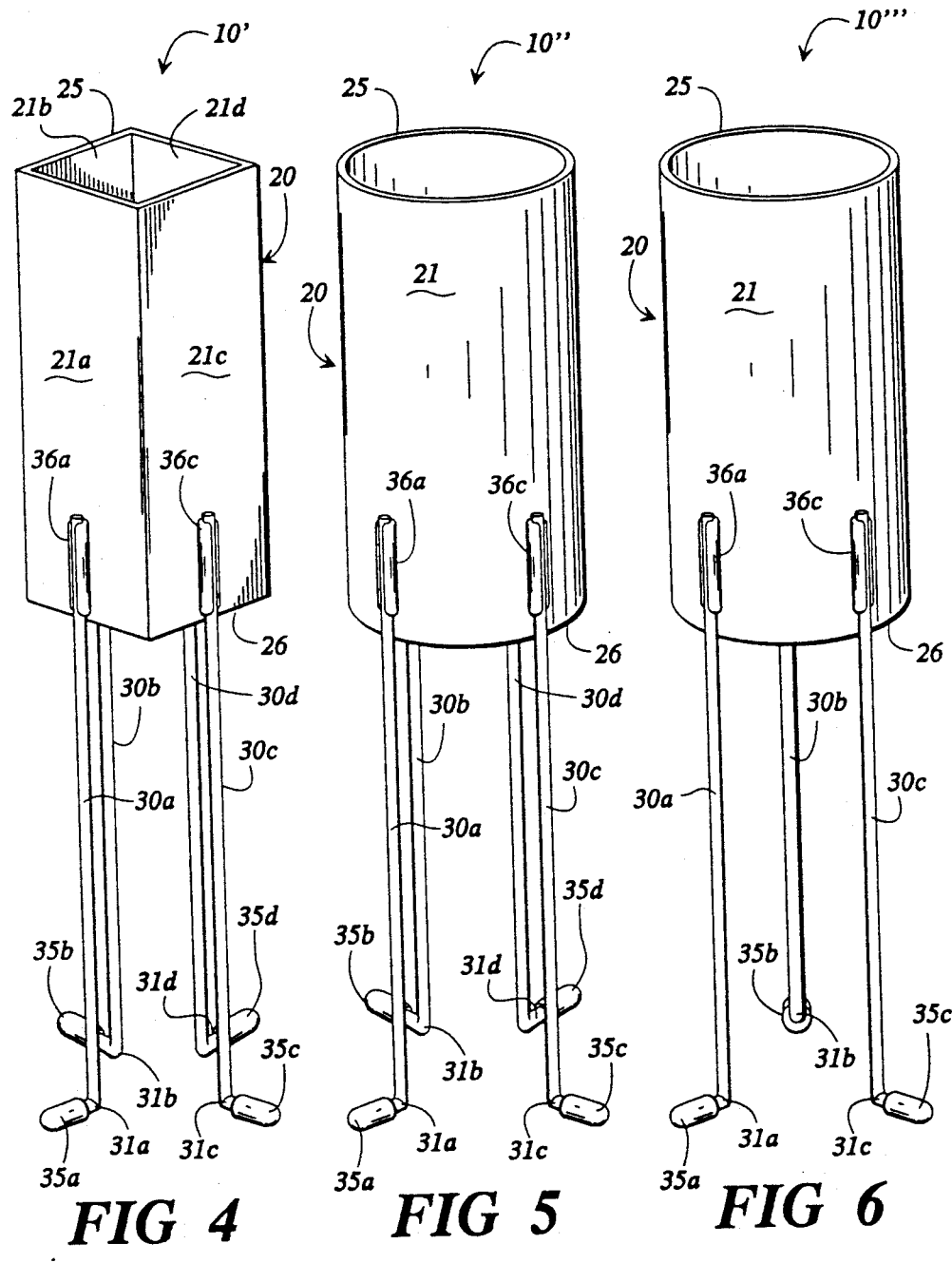

CONDUIT SUPPORT APPARATUS FOR CONCRETE INSTALLATION

This application is a continuation-in-part of U.S. patent application Ser. No. 07/518,649, filed May 3, 1990, entitled CONDUIT SUPPORT DEVICE FOR USE IN CONCRETE INSTALLATION.

FIELD OF THE INVENTION

The present invention relates generally to the field of construction hardware and methods and, more specifically, to the field of flexible conduit support and construction in concrete structures.

BACKGROUND OF THE INVENTION

The construction of floors, ceilings, and walls using concrete is very well known within the construction industry. It is frequently necessary to supply utility service (electrical power, telephone, thermostat control) through the concrete structures, passing from room to room or from floor to floor. There are several well-known methods of supplying utility service through the concrete structures. Perhaps the most obvious method involves simply drilling completely through the formed concrete slab to provide access to the other side of the slab. Another approach which achieves the same result involves placing a sleeve insert at the desired hole location before the concrete is poured. These two methods provide passageways between each side of the slab.

It is also common to bury service-carrying conduit within the concrete slabs to provide utility service to a wall or to a floor receptacle. An extensive network of rigid conduit is frequently constructed within the concrete form used to retain the wet concrete during pouring and define the boundaries of the slab. Steel reinforcement mesh is also often used to strengthen the concrete slab and conveniently provides a support location for securing the rigid conduit network. Access to the conduit network is normally needed above the finished slab in walls, floor receptacles, and utility rooms.

Because there are several types of rigid conduit currently being used in the industry, several different methods of providing above-the-slab access to the conduit network are used. For galvanized rigid steel (GRS) and intermediate metallic conduit (IMC), small sections of conduit are oriented in a relatively vertical direction and simply connected, through the use of conduit connection members, to the conduit network at desired access locations. During the pouring of the concrete, the vertical sections of conduit resist the force of the flowing concrete and remain securely placed in their original, intended positions. After the concrete is poured, the top ends of the vertical sections of conduit remain exposed, providing access to the network.

Construction of the conduit network, including providing above-the-slab access, typically requires extensive time and effort in cutting and re-connecting the rigid conduit sections with special connectors to change the direction of the conduit. Rigid non-metallic conduit (commonly referred to as PVC) is also used in the industry. Although PVC can be cut and re-connected in a manner similar to GRS and IMC, it can also be heated and bent to change the direction of the conduit. This process also requires extensive time and effort. Similarly, electrical metallic tubing (EMT), although slightly more flexible than GRS, IMC, or PVC, requires the use of special bending tools to change the direction of the conduit. This requirement also introduces excessive time and effort into the construction process.

More recently, flexible conduit, known as electrical non-metallic tubing (ENT), has been used in place of the less workable rigid conduit. Because the newer flexible conduit readily bends around corners without the need for heat or special bending tools, fewer sections of conduit and less time are required to construct the network. Ideally, only one section of conduit is required to travel between one access point and another access point. Each access point is provided by simply bending one end of the flexible conduit upward above the intended upper level of the slab. In this manner, no additional conduit connection members are necessary to provide access to the network.

Although flexible conduit offers the advantage of minimizing time and effort in being easily bent around corners in the horizontal network, it also offers several disadvantages. After the flexible conduit is bent upward, it tends to fall back down into the intended concrete slab area without proper support. Flexible conduit requires an adequate supporting force to hold it in a bent position. The steel reinforcement mesh typically can not provide an adequate support for correctly positioning the flexible conduit. Also, the flexible conduit does not effectively resist the force of flowing concrete during the pouring and moves from the original intended position.

Furthermore, after the concrete is poured, the exposed flexible conduit is susceptible to many hazards. For example, one of the many workman on the construction site may inadvertently kick and damage the exposed flexible conduit before a wall or floor receptacle is installed. There is, therefore, a need in the art to provide solutions to these and other serious problems.

BRIEF SUMMARY OF THE INVENTION

Briefly described, the present invention includes a conduit support apparatus for concrete installation comprised of a collar portion supported by at least one vertical support member which is removably fastened to a concrete mold or form (hereinafter referred to as a "form"). The collar portion defines a relatively vertical passageway through which at least one flexible conduit portion may pass and be supported in a relatively vertical orientation. In the preferred embodiment, several support members are used to support the collar portion above the form, which collar portion is capable of supporting several flexible conduits. Each support member defines an upper relatively vertical section attached to the collar portion and a lower relatively horizontal section which is constructed to be manually fastened to the form with fasteners such as staples or nails.

In a first preferred embodiment, the entire apparatus is constructed of a very strong plastic as a single assembly. While retaining strength comparable to that of steel, the apparatus is simple and economical to construct. After the form is removed from the slab, the plastic bottoms of the support members might be slightly exposed. If desirable, these exposed ends are sanded to become level with the concrete slab. In a second embodiment, the collar portion and support members are constructed from steel to provide very strong support for the flexible conduit. The support members are connected to the collar portion at spot welds. Plastic "bullet" tips cover the bottom ends of the support members which contact the form. After the form is removed from the slab, the plastic tips, as opposed to the steel, might be partially exposed. This arrangement prevents exposure of the steel support members and provides protection against rust. This arrangement also provides for minor surface leveling if the plastic tip is partially exposed, ie., sanding of the plastic.

In the preferred embodiment, each dimension of the present invention is designed to ensure, among other things, that a flexible conduit, upon being pushed through the collar portion, is caused to bend with a curvature within a range of optimum curvatures. If the curvature of the bend is too small, (i.e., the radius of curvature is large) the upper section of the flexible conduit tends to not be placed in a sufficiently vertical orientation. Lengthy upper sections tend to bend back over into the form space, becoming embedded in the concrete slab, similar to the problem related to attempting to secure the flexible conduit to the steel reinforcement mesh. Conversely, if the curvature is too large, (ie., the radius of curvature is small) the flexible conduit tends to collapse inward on itself, reducing the diameter of the flexible conduit. In addition to restricting the working area inside the flexible conduit, the time and effort required to force the flexible conduit into a very sharp bend is wasteful and unnecessary. Building codes may also restrict the amount of curvature in conduit.

The distances from the top of the collar portion to the bottom of the collar portion, from the bottom of the collar portion to the bottom of the form, and from one side of the collar portion to the other side of the collar portion are all dimensions which affect the range of curvatures. The present invention, in its preferred embodiment, provides a unique balance of dimensions which ensures that the flexible conduit is bent within an optimum range of curvatures.

Also, the height of the entire apparatus is preferably designed to extend the upper portion of the collar slightly above the upper level of the slab, providing protection to the flexible conduit against an inadvertent kick. If the exposed collar portion interferes with the placement of a wall or other object, it can be cut away to be level with the slab.

It is therefore an object of the present invention to provide a conduit support apparatus for supporting an upper end of at least one flexible conduit above an intended level of concrete before and during the pouring of the concrete into a form.

Another object of the present invention is to provide a conduit support apparatus which supports flexible conduit during concrete installation, uses an economy of parts, and provides for simplicity of operation.

Another object of the present invention is to provide a conduit support apparatus which includes a collar portion which defines a relatively vertical passageway and at least one support member which is attached to the collar portion and supports the collar portion above a form.

Another object of the present invention is to provide a conduit support apparatus wherein each dimension of the apparatus is designed to ensure, among other things, that a flexible conduit, upon being pushed through the collar portion, is caused to bend with a curvature within a range of optimum curvatures.

Yet another object of the present invention is to provide a conduit support apparatus which is constructed of steel or very strong plastic capable of resisting movement due to inadvertent bumping by workers before the concrete is poured and capable of resisting the force of flowing concrete as the concrete is poured into the form.

Still another object of the present invention is to provide a conduit support apparatus with plastic-bottomed support members, which support members are fastened to the form with fastening elements, which fastening elements are clipped away from the concrete slab when the form is removed from the slab.

Still another object of the present invention is to provide a concrete form structure which includes a form member for retaining the wet concrete, at least one flexible conduit member for partial burial within the concrete and for partial exposure above the concrete, and at least one conduit support apparatus for supporting the exposed portion of the flexible conduit member above the concrete.

Still another object of the present invention is to provide a concrete form structure which includes a form member for retaining the wet concrete, at least one flexible conduit member for partial burial within the concrete and for partial exposure above the concrete, and at least one conduit support apparatus for supporting the exposed portion of the flexible conduit member above the concrete, which apparatus includes at least one support member which, upon pouring of the concrete, becomes completely embedded in concrete and a collar portion which becomes at least partially embedded in concrete with concrete inside a relatively vertical passageway formed by the collar portion.

Other objects, features and advantages of the present invention will become apparent upon reading and understanding the present specification, when taken in conjunction with the accompanying drawings.

BRIEF DESCRIPTION OF THE DRAWINGS

FIGS. 4–6 are perspective views of alternate embodiments of a conduit support apparatus for concrete installation.

DETAILED DESCRIPTION OF THE PREFERRED EMBODIMENT

Identification of Elements

Figure 1:
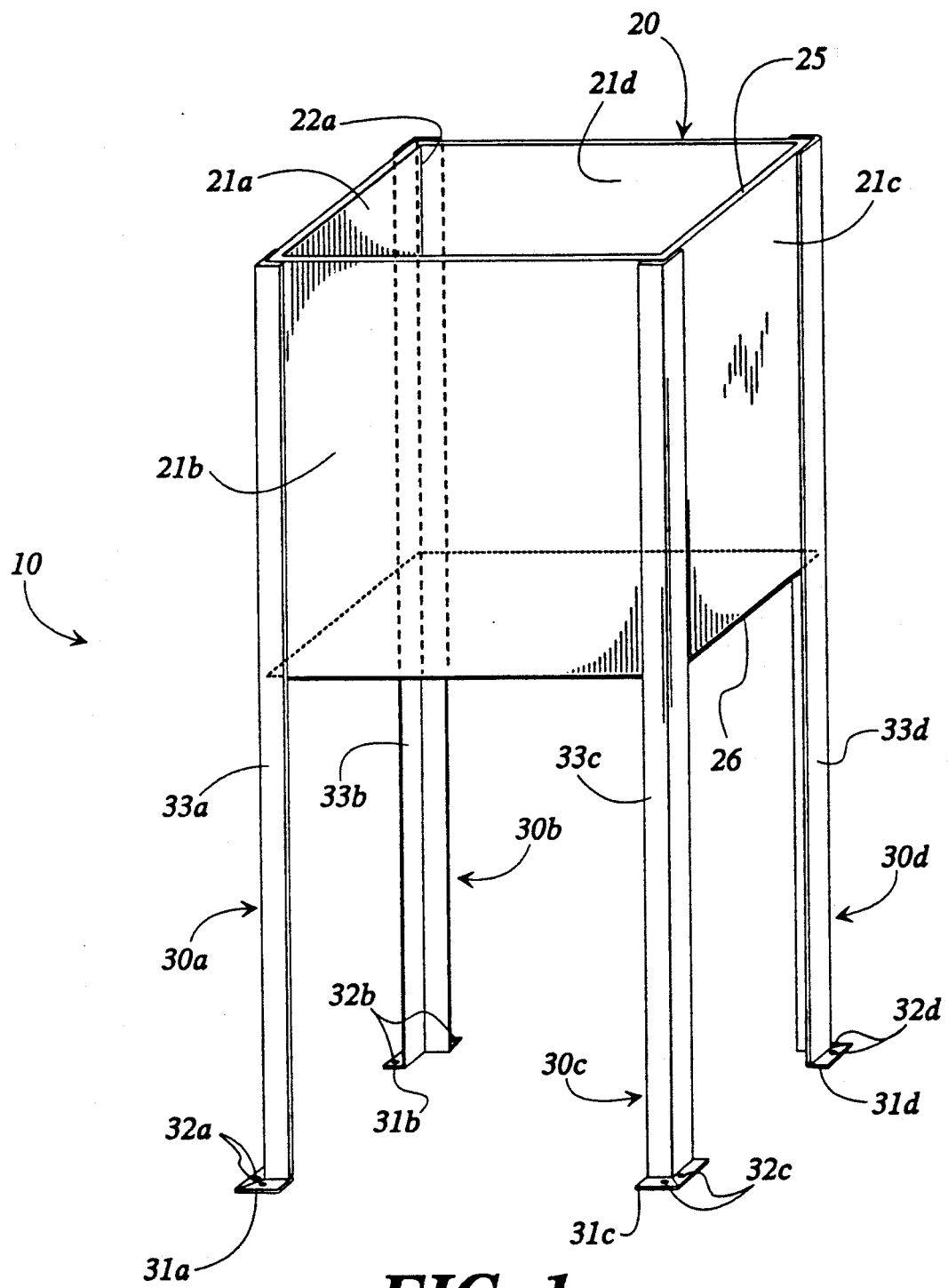
FIG. 1 is a perspective view of a preferred embodiment of a conduit support apparatus for concrete installation.

Referring now in greater detail to the drawings in which like numerals represent like components throughout the several views, FIG. 1 shows a perspective view of a preferred embodiment of a conduit support apparatus 10 for concrete installation. The conduit support apparatus 10 is seen as a single assembly including collar portion 20, shaped as a rectangular tube, and support members 30a–30d. (Letter denotations, such as the "a–d" in "30a–30d", are used to indicate the presence of two or more similar elements utilized in the present invention. References to numbers alone, such as "30", are also considered directed to all identical elements.) Collar portion 20 includes collar sides 21a–21d which intersect at collar corners 22a–22d. (22b–22d are hidden from view). Collar top 25 and collar bottom 26 are also indicated. Support members 30a–30d are connected to collar corners 22a-22d and seen including vertical support sections 33a-33d and support flanges 31a-31d, the horizontal bottoms of support members 30, which include flange holes 32a-32d.

Figure 2:
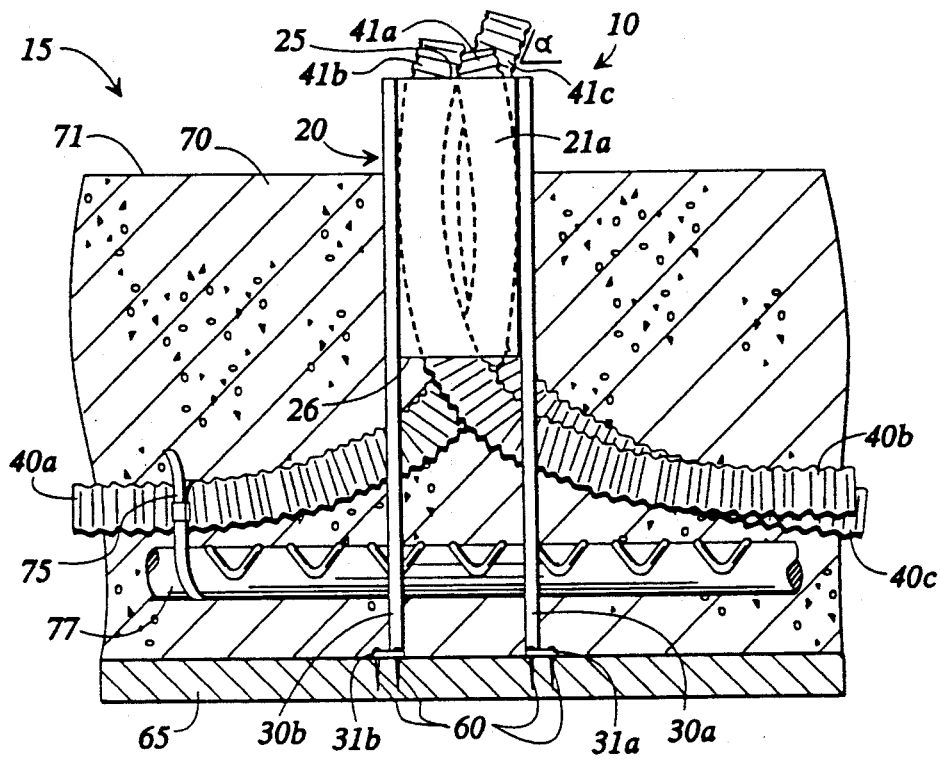
FIG. 2 is a side elevational view of the preferred embodiment of FIG. 1 shown as an element in a preferred embodiment of a concrete form structure.

FIG. 2 shows a side elevational view of the preferred embodiment of FIG. 1 shown as an element in a preferred embodiment of a concrete form structure in accordance with the present invention. Concrete form structure 15 is seen including a conduit support apparatus 10 partially embedded in concrete slab 70. Slab top 71 is seen extending into collar portion 20. Support flanges 31 of support members 30 are seen fastened to form bottom 65 by fasteners 60. Flexible conduits 40a-40c are seen threaded between support members 30, into collar bottom 26, and out collar top 25 of collar portion 20. Conduit top sections 41a-41c are seen extending above conduit support apparatus 10. A plastic tie 75 is also seen connecting flexible conduit 40a to steel reinforcement mesh 77.

Figure 3:
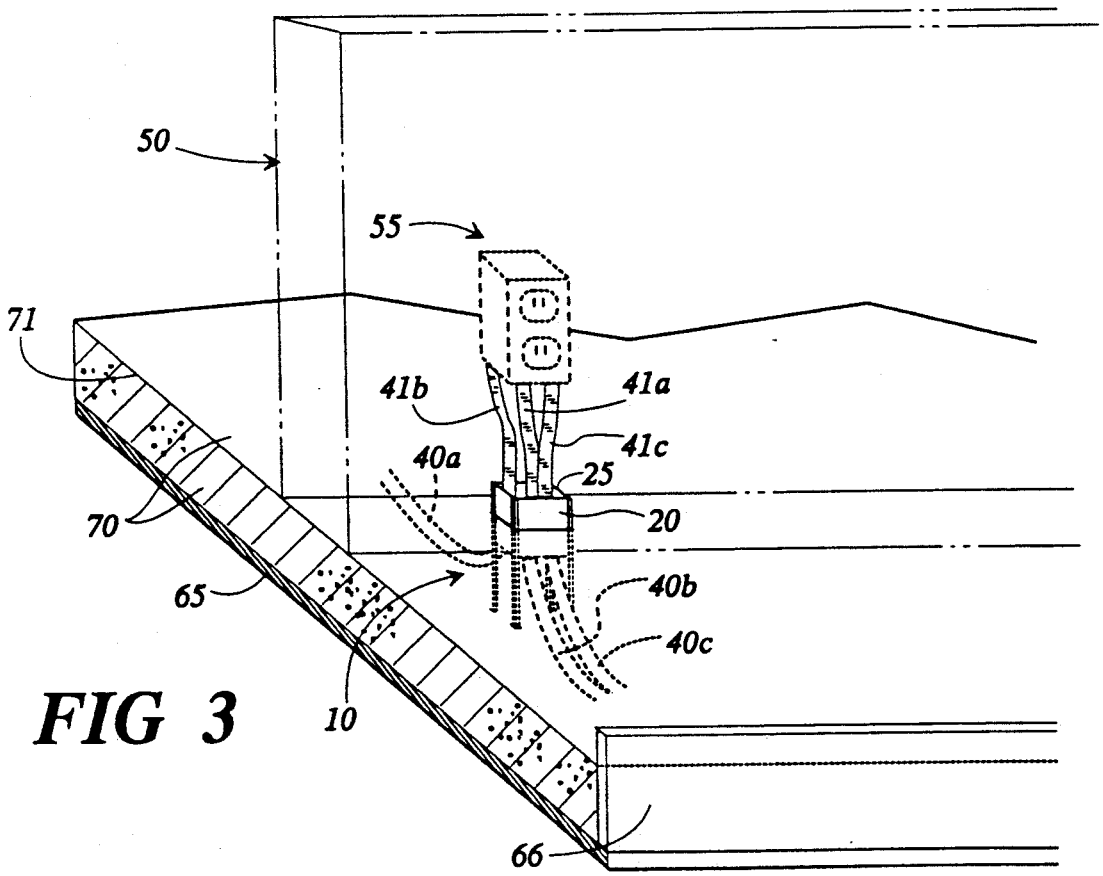
FIG. 3 is a perspective view of the preferred embodiment of FIG. 2.

FIG. 3 shows a perspective view of the preferred embodiment of FIG. 2. Concrete slab 70 is seen retained by form bottom 65 and form side 66. Resting on slab top 71 is wall 50, shown in dotted form to represent its future location. Outlet box 55 is shown as a future component contained within wall 50. A conduit support apparatus 10 is seen under wall 50 with collar top 25 extending above slab top 71. Conduit top sections 41 are seen extending above conduit support apparatus 10 connected to outlet box 55, while lower sections of flexible conduit 40 are seen buried in concrete slab 70 and represented, for clarity, as being cut away before entering conduit support apparatus 10.

Description of Elements

Referring again to FIG. 1, the preferred embodiment of conduit support apparatus 10 is constructed as a single assembly of very durable plastic with strength similar to that of steel. In alternate embodiments, other lightweight materials are also acceptable. In the preferred embodiment, in which conduit support apparatus 10 is constructed of plastic, the placement of support members 30 on collar corners 22 assists in the structural strength of conduit support apparatus 10.

Referring now to FIG. 2, concrete form structure 15 is seen including conduit support apparatus 10, form bottom 65, (form side 66 is seen in FIG. 3), fasteners 60, flexible conduits 40, and steel reinforcement mesh 77. Support members 30 of conduit support apparatus 10 are used to support collar portion 20 at a predetermined distance above form bottom 65. Concrete slab 72 is seen surrounding conduit support apparatus 10, burying steel reinforcement mesh 77 and fasteners 60, and partially burying flexible conduits 40. Form bottom 65 is used as is known in the industry to retain wet concrete during pouring until the concrete hardens into concrete slab 70 with slab top 71. Steel reinforcement mesh 77 is often used, as is also well-known within the industry, to provide greater strength to concrete slab 70.

Flexible conduits 40 are partially buried in concrete slab 70 to carry electrical wires for utility service to access locations, including walls, floor outlets, and utility rooms. Top sections 41 of flexible conduits 40 are bent vertically above intended slab level 71 at access locations. One acceptable example of flexible conduits 40 is the Electrical Non-metallic Tubing available from Carlon, Electrical Sciences, Inc. of Cleveland, Ohio. Plastic ties 75 are used at various locations throughout concrete slab 70 to secure flexible conduits 40 to steel reinforcement mesh 77. However, it is clear from FIG. 2 that steel reinforcement mesh 77 is not readily capable of providing vertical support to conduit top sections 41 of flexible conduits 40. Conduit support apparatus 10 is used in conjunction with fasteners 60 and form bottom 65 to provide necessary vertical support for conduit top sections 41. Acceptable examples of fasteners 60 include nails, tacks, and staples, and other similar elements.

The exact dimensions of conduit support apparatus 10 are considered variable, depending on the intended height of slab top 71 as well as the intended numbers and diameters of flexible conduits 40 to be used in each conduit support apparatus. However, the relationship between all the dimensions of conduit support apparatus 10 are very important and considered unique to the present invention. In one application of the preferred embodiment of the present invention, slab top 71 is 6 inches from form bottom 65, collar top 25 is 8 inches from form bottom 65, collar bottom 26 is 4 inches from form bottom 65, collar sides 21a and 21c are each 2 inches wide, and collar sides 21b and 21d are each 4 inches wide. The relationships between the vertical distance between collar top 25 and collar bottom 26, the vertical distance between collar bottom 26 and form bottom 66, and the horizontal distance between each support member 30 are very important. These relationships determine the degree of curvature which is placed on flexible conduits 40 as they are pushed through conduit support apparatus 10. Ideally, this curvature lies within an optimum range of curvatures.

This optimum range can be defined between two undesirable limits. A first limit is defined by a very small curvature (ie., a very large radius of curvature). The degree of curvature affects the angle at which conduit top sections 41 exits collar top 25 relative to the horizontal plane formed by form bottom 65. If this exit angle, indicated as angle $\alpha$ with respect to conduit top section 41c, is too small, conduit top sections 41 tend to fall back over into the form space, below the intended slab top 71. Conduit top sections 41 typically extend from 18 to 24 inches above collar top 25 for electrical outlets. However, in order to serve a light switch, conduit top sections extend several feet. In this second situation, conduit top sections 41 are bent over and fastened to themselves in a loop. This added weight must also be supported by conduit support apparatus 10. Allowing conduit top sections 41 to fall over into the form space is a result avoided by the preferred embodiment of the present invention.

Conversely, if the curvature is too large, (i.e., the radius of curvature is too small) flexible conduit 40 tends to collapse into itself, reducing to amount of useable space within flexible conduits 40. This result is also avoided with the preferred embodiment. The relationships between each of the aforementioned dimensions of conduit support apparatus 10 and their effect on the curvature of flexible conduits 40 are considered understood. Also, dimensions which only enable a conduit support apparatus 10 to support very short conduit top sections 41 are also within the scope of the present invention.

Collar top 25 is seen extending slightly above slab top 71, concrete slab 70 partially filling collar portion 20. Workmen on a construction site tend to inadvertently kick objects extending out of concrete slab 70. Collar top 25 provides protection to flexible conduits 40 after concrete slab 70 is poured and hardened. However, collar top 25 may be cut away if it is found to interfere with the location of other elements, such as walls or floor outlets. In the preferred embodiment, the plastic collar top 25 can be readily cut away from collar 20. Although the above advantage is realized in allowing collar top 25 to extend above slab top 71, complete burial of collar portion 20 is also considered within the scope of the present invention.

Operation of Preferred Embodiment

Referring to FIGS. 1-3, the operation of the preferred embodiment of the present invention is as follows. A form is constructed by connecting form bottoms 65 to form sides 66 in the shape of a box, as is known in the industry. Steel reinforcement mesh 77 is placed inside the form, as is also known in the industry. A network of flexible conduit is then placed on top of steel reinforcement mesh 77 and secured thereto with plastic ties 75. At each future location of a wall outlet, floor outlet, or other utility outlet, a conduit support apparatus 10 is placed on top of form bottom 65. Support members 30 are also arranged to not interfere with steel reinforcement mesh 77. Fasteners 60 are then driven through flange holes 32 to fasten conduit apparatus 10 to form bottom 65. Flexible conduits 40 are then pushed through collar bottom 26 and out of collar top 25 with very little effort. Conduit top sections 41 are then looped over if needed, as previously described with reference to the need for longer conduit top sections 41 for light switches and the like.

Concrete is then poured on top of form bottom 65 until the intended level of slab top 71 is reached and allowed to harden into concrete slab 70. The concrete surrounds conduit support apparatus 10 and partially fills collar portion 20. Because of the conduit support apparatus 10 of the present invention, flexible conduits 40 remain relatively stationary in their intended locations. Collar top 25 provides protection to conduit top sections 41. Form bottom 65 is removed from slab 70 after the concrete hardens. Fasteners 60 are broken away from the underside of slab 70 which is also sanded to produce a level surface. Plastic support flanges 31 are readily sanded during this process if they extend below the lower level of slab 70.

Description of Alternate Embodiments

FIGS. 4-6 are perspective views of alternate embodiments of a conduit support apparatus 10 for concrete installation. In these embodiments, collar portions 20 and support members 30 are constructed of steel as separate components and joined together at spot welds 36. Preferably, exposure of steel after the form is removed is to be avoided because of the difficulty encountered in sanding steel and its propensity to rust. Thus, in steel embodiments, plastic protectors 35 are placed around support flanges 31 to be interposed between support flanges 31 and form bottom 65 (seen in FIGS. 2 and 3). Plastic protectors 35 may be easily sanded and prevent exposure of steel support flanges 31. Staples, or similar components, are used to fasten support flanges 31 to form bottom 65.

FIG. 4 shows a conduit support apparatus 10'. Collar portion 20 is one piece of steel shaped as a square tube. Four collar sides 21a-21d are seen between collar top 25 and collar bottom 26. Four support members 30a-30d are centrally connected to collar sides 21a-21d at spot welds 36a-36d. (36b and 36d are hidden from view.) By centering support members 30 on collar sides 21, alignment of conduit support apparatus 10 along a wall center line is facilitated.

FIG. 5 shows another alternate embodiment of a conduit support apparatus 10". Collar portion 20 is seen shaped as a circular tube. Four support members 30a-30d are circumferentially distributed about collar portion 20 at spot welds 36a-36d. Support members 30 of FIG. 5 are similar to support members 30 of FIG. 4.

FIG. 6 shows another alternate embodiment of a conduit support apparatus 10''' wherein only three support members 30 are connected to collar portion 20. Other aspects of conduit support apparatus 10 of FIG. 6 are similar to those of conduit support apparatus 10 of FIG. 5. Various other shapes of collar portion 20 are also considered acceptable. Other numbers of support members 30 which provide adequate stabilization for collar portion 20 are also considered acceptable.

While the embodiments of the present invention which have been disclosed herein are the preferred forms, other embodiments of the method and apparatus of the present invention will suggest themselves to persons skilled in the art in view of this disclosure. Therefore, it will be understood that variations and modifications can be effected within the spirit and scope of the invention and that the scope of the present invention should only be limited by the claims below.

I claim:

1. A conduit support apparatus for supporting flexible conduit before and during the pouring of wet concrete into a form to dry into a hardened concrete slab, which form includes a form bottom section and form side sections which retain wet concrete and are removable from the hardened concrete slab, said conduit support apparatus comprising:

a collar portion defining a passageway for receiving at least one flexible conduit; and at least one support member connected to said collar portion for supporting said collar portion above a form bottom section wherein selected physical dimensions of said collar portion and said at least one support member are balanced to impose on a flexible conduit a bend which has a curvature within an optimum curvature range.

2. A conduit support apparatus as recited in claim 1, wherein said collar portion further comprises four side sections connected together at right angles to form four corners, whereby said passageway defines, in cross-section, a rectangle.

3. A conduit support apparatus as recited in claim 1, wherein said collar portion further comprises one side section whereby said passageway defines, in cross-section, a circle.

4. A conduit support apparatus as recited in claim 2, wherein said conduit support apparatus comprises four support members connected to said four corners of said collar portion for supporting said collar portion above a form bottom section.

5. A conduit support apparatus as recited in claim 2, wherein said conduit support apparatus comprises four support members centrally connected along said four sides sections of said collar portion for supporting said collar portion above a form bottom section.

6. A conduit support apparatus as recited in claim 1, wherein said selected physical dimensions of said collar portion include collar depth, collar width, and support length, wherein said collar portion further comprises a collar top and a collar bottom located below said collar top, wherein said collar depth defines a distance between said collar bottom and said collar top, wherein said collar width defines a maximum possible horizontal displacement of a flexible conduit between said collar bottom and said collar top, and wherein said support length defines a distance between said collar bottom and the form bottom section.

7. A conduit support apparatus for supporting flexible conduit before and during the pouring of wet concrete into a form to dry into a hardened concrete slab, which form includes a form bottom section and form side section which retain wet concrete and are removable from the hardened concrete slab, said conduit support apparatus comprising:
a collar portion defining a passageway for insertion of at least one flexible conduit, and including, at least, four vertical side sections connected together at right angles to form four corners, whereby said passageway defines, in cross-section, a rectangle; and
four support members, each support member connected along one of said four corners for supporting said collar portion above a form bottom section, each of said support members including a bottom which includes at least one fastener hole designed to receive a fastener to secure said conduit support apparatus to the form bottom section, and
wherein said support apparatus is constructed entirely of durable plastic as a single molded structure.

8. A concrete form structure, comprising:
a form member for retaining wet concrete to form a hardened concrete slab having an upper slab level, said form member comprising at least one form side section and at least one horizontal form bottom section, said form member constructed to be removable from the hardened concrete slab;
A flexible conduit member for partial burial within the hardened concrete slab;
at least one support member fastened to the form bottom section in a relatively vertical orientation;
at least one fastening member fastening said at least one support member to the form bottom section; and
a collar portion supported by said at least one support member above the bottom section of a form, said collar portion defining a relatively vertical passageway and defining a collar top positioned above an upper slab level,
said flexible conduit member being arranged within said form in a predetermined arrangement and a portion of said flexible conduit member passing through said passageway, whereby a portion of said flexible conduit member is supported above said form member.

9. A concrete form structure as recited in claim 8, wherein said at least one support member and said collar portion are constructed entirely of durable plastic as a single molded structure.

10. A concrete form structure as recited in claim 8, wherein said at least one support member includes a horizontal bottom which includes at least one fastener hole designed to receive said fastening member to secure said at least one support member to the form bottom section, said fastening member being breakable.

11. A concrete form structure as recited in claim 1, wherein selected physical dimensions of said collar portion and said at least one support member are balanced to, among other things, impose on said flexible conduit a bend which has a curvature within an optimum curvature range.

12. A conduit support apparatus for supporting flexible conduit before and during the pouring of wet concrete into a form to dry into a hardened concrete slab, which form includes a form bottom section and form side sections which retain wet concrete and are removable from the hardened concrete slab, said conduit support apparatus comprising:
a collar portion defining a passageway for receiving at least one flexible conduit; and
at least one support member connected to said collar portion for supporting said collar portion above a form bottom section, said support member including, at least,
a support top connected to said collar portion,
a support bottom constructed to be fastened to the form bottom section, and
a plastic protector constructed to be interposed between said support bottom and the form bottom section.

13. A conduit support apparatus for supporting flexible conduit before and during the pouring of wet concrete into a form to dry into a hardened concrete slab, which form includes a form bottom section and form side sections which retain wet concrete and are removable from the hardened concrete slab, said conduit support apparatus comprising:
a collar portion defining a passageway for receiving at least one flexible conduit; and
at least one support member connected to said collar portion for supporting said collar portion above a form bottom section, and
said conduit support apparatus being constructed entirely of durable plastic as a single molded structure.

14. A conduit support apparatus as recited in claim 13, wherein said at least one support member includes a support bottom which includes at least one fastener hole designed to receive a fastener to secure said conduit support apparatus to the form bottom section.

15. A conduit support apparatus for supporting flexible conduit before and during the pouring of wet concrete into a form to dry into a hardened concrete slab, which form includes a form bottom section and form side sections which define a form space for retaining wet concrete and are removable from the hardened concrete slab, said conduit support apparatus comprising:
a collar portion defining a passageway for receiving at least one flexible conduit; and
at least one support member connected to said collar portion for supporting said collar portion above a form bottom section,
wherein selected physical dimensions of said collar portion and said at least one support member are balanced to, among other things, impose on a flexible conduit a bend which has a curvature within an optimum curvature range, and
wherein said optimum curvature range defines a range of curvatures which spans between, but excludes, a first small curvature wherein a flexible conduit is so slightly bent away from the form bottom section that the flexible conduit bends back down into a form space, and a second large curvature wherein a flexible conduit at least slightly collapses inward on itself.

16. A conduit support apparatus for supporting flexible conduit before and during the pouring of wet concrete into a form to dry into a hardened concrete slab, which form includes a form bottom section and form side sections which define a form space for retaining wet concrete and are removable from the hardened concrete slab, said conduit support apparatus comprising:
- a collar portion defining a passageway for receiving at least one flexible conduit; and
- at least one support member connected to said collar portion for supporting said collar portion above a form bottom section, and
- wherein selected physical dimensions of said collar portion and said at least one support member are balanced to, among other things, impose on a flexible conduit a bend which orients an upper end of the flexible conduit, as it exits said collar portion, to form an exit angle with the form bottom section within an optimum exit angle range.

17. A conduit support apparatus as recited in claim 16, wherein said selected physical dimensions of said collar portion include collar depth, collar width, and support length, wherein said collar portion further comprises a collar top and a collar bottom located below said collar top, wherein said collar depth defines a distance between said collar bottom and said collar top, wherein said collar width defines a maximum possible horizontal displacement of a flexible conduit between said collar bottom and said collar top, and wherein said support length defines a distance between said collar bottom and the form bottom section.

18. A conduit support apparatus as recited in claim 17, wherein said optimum exit angle range defines a range of exit angles which spans between, but excludes, a first small exit angle wherein a flexible conduit is so slightly bent away from the form bottom section that an upper section of the flexible conduit bends back over into a form space, and a second large exit angle wherein a flexible conduit at least slightly collapses inward on itself.

19. A concrete formation system comprising:
- a form means for defining a slab space and bounding wet concrete within the slab space until the wet concrete dries into a hardened concrete slab;
- a conduit support apparatus including, at least,
  - a support portion connected to the form means, and
  - a collar portion connected to said support portion and defining a conduit passageway; and
- a flexible conduit member located partially within the slab space and extending through the conduit passageway defined by said collar portion of said conduit support apparatus.

20. A concrete formation system as recited in claim 19, wherein said form means includes, at least, a form base and a plurality of form sides connected to said form base, and wherein said form means is removable from the hardened concrete slab.

21. A concrete formation system as recited in claim 19, wherein said conduit support apparatus defines a unitary structure.

22. A concrete formation system as recited in claim 19, wherein said collar portion extends partially outside the slab space.

23. An apparatus for supporting at least one flexible conduit segment above a form base, said form base defining a slab space and bounding wet concrete within said slab space, said flexible conduit segment located partially within said slab space, said apparatus comprising:
- an orientation means for directing a flexible conduit segment away from a form base; and
- a support means connected to said orientation means for supporting said orientation means above the form base.

24. Apparatus of claim 23, wherein said orientation means includes, at least, a collar member defining a conduit passageway for receiving at least one flexible conduit section.

25. Apparatus of claim 24, wherein said collar member is a unitary structure, wherein said passageway defines a center line, and wherein said collar member is so oriented that said center line is perpendicular to said form base.

* * * * *